United States Patent [19]

Steinberg et al.

[11] Patent Number: 4,548,779
[45] Date of Patent: Oct. 22, 1985

[54] ROTATIONAL MOLDING MULTILAYERED ARTICLES

[75] Inventors: Albert H. Steinberg, Morris Plains; Frank Petruccelli, Boonton; Mariann E. Lucas, Budd Lake; Lev Zlatkevich, South Orange, all of N.J.

[73] Assignee: Allied Corporation, Morris Township, Morris County, N.J.

[21] Appl. No.: 441,811

[22] Filed: Nov. 15, 1982

[51] Int. Cl.$^4$ ............................................... B29C 5/04
[52] U.S. Cl. .................................... 264/255; 264/310; 264/311
[58] Field of Search .................. 264/255, 310, 311

[56] References Cited

U.S. PATENT DOCUMENTS

| | | | |
|---|---|---|---|
| 3,202,745 | 8/1965 | Ringdal | 264/255 |
| 3,542,912 | 11/1970 | Rielly et al. | |
| 3,669,827 | 6/1972 | Kolyer et al. | 264/255 |
| 3,845,163 | 10/1974 | Murch | |
| 3,966,870 | 6/1976 | Vecchiotti | 264/255 |

FOREIGN PATENT DOCUMENTS 1381863 1/1975 United Kingdom ............... 264/255

Primary Examiner—James Derrington
Attorney, Agent, or Firm—Richard A. Negin; Patrick L. Henry; Richard A. Anderson

[57] ABSTRACT

A method of rotationally molding a multi-layered article. The outer layer is first rotationally molded and solidified. An inner polymer layer is fed into the mold cavity and an inner layer is rotationally molded to the inner surface of the outer layer. Preferably, the outer layer and inner layer are thermoplastics. The outer layer polymer has a melting point higher than the inner layer polymer. The outer layer is rotationally molded and cooled to below its melt temperature but above the melt temperature of the inner layer polymer. The inner layer is then rotationally molded while the outer layer remains solid.

12 Claims, No Drawings

ROTATIONAL MOLDING MULTILAYERED ARTICLES

BACKGROUND OF THE INVENTION

The present invention is in the field of rotational molding; more particularly, the invention relates to rotationally molded articles and a method to rotationally mold articles having at least two layer made of different polymeric materials.

Rotational molding, also known as rotomolding, is used in the manufacture of hollow objects from thermoplastics. In the basic process of rotational molding, solid or liquid polymers are place in a mold. The mold is first heated and then cooled while being rotated about two perpendicular axes simultaneously. Many polymers can be used in the rotational molding process. Popular polymers for this use are polyolefins such as polyethylene. It is also known to use polycarbonates, crosslinkable polyethylene, nylon, and other materials. In selecting the rotational molding grade formulation, care must be taken to assure that there will not be thermal degradation during the heating cycle. A general discussion on rotational molding is given in MODERN PLASTICS ENCYCLOPEDIA 1979–1980, Volume 56, No. 10A, beginning at Page 381.

U.S. Pat. No. 3,542,912 discloses rotational molding of multi-layered articles. In this disclosure the rotationally molded article has layers of different polymers in the article wall. The outside layers have a higher melting point than the inside layers.

U.S. Ser No. 441,820 filed the same date as this application, entitled Rotational Molding of Articles Having Impact Resistance by Steinberg and Flood discloses a composition useful for rotational molding. This composition comprises a polyamide, preferably polyepsiloncaprolactam, on 1 to 15, preferably 3 to 10 percent by weight of a copolymer of an alphaolefin, preferably ethylene and a carboxylic acid, preferably methacrylic acid, neutralized up to 100% with metal, preferably zinc ions. This patent application is hereby incorporated by reference.

SUMMARY OF THE INVENTION

The present invention is a method of rotationally molding an article having at least two layers, an outer layer made of an outer polymer and an inner layer made of an inner polymer. The outer polymer is fed into the cavity of the rotational mold and rotationally molded to form the outer layer. The outer layer is solidified. The inner polymer is fed into the rotational mold cavity while maintaining the outer layer solid and the inner polymer layer is rotationally molded adjacent to the inner surface of the outer layer.

In a preferred embodiment of the present invention, the outer polymer and inner polymer are made from thermoplastic compositions. Where both the outer polymer and inner polymer are made from thermoplastic compositions, the melting point of the inner polymer is at a temperature lower than the melting point of the outer polymer.

In a preferred method of the present invention, the outer polymer is fed into the cavity of the rotational mold and rotationally molded to form the outer layer. The outer layer is cooled to below the melting temperature of the inner polymer. The inner polymer is fed into the cavity of the rotational mold and rotationally molded to form the inner layer adjacent to the inner surface of the solidified outer polymer layer. If the outer layer and rotational mold have sufficient heat the inner layer can be rotationally molded without additional heat. If more heat is required to rotationally mold, the inner layer heat can be added through the mold cavity and outer layer. The outer layer is maintained as a solid below the melting temperature of the outer polymer during the additional heating.

In a preferred process of the present invention, the outer polymer is a polymer blend of a polyamide composition comprising the polyamide and a copolymer comprising units derived from an alpha-olefin of the formula $RCH=CH_2$ where R is H or an alkyl having from 1 to 8 carbon atoms and from 0.2 to 25 mol percent based on the alpha-olefin-acid copolymer of an alpha, betaethylenically unsaturated carboxylic acid having from 3 to 8 carbon atoms. The copolymer has from 10% to 100% of the carboxylic groups neutralized by metal ions.

It is recognized that the process of the present invention can be used to successively add a layer of polymeric material to the inner surface of each polymer layer. The layers which are outer to the last inner layer are maintained as solids and the innermost polymer is rotationally molded to the inner surface of the last-added layer.

When using the preferred polyamide composition, it has been found that the polyamide composition can be maintained above its melt temperature and a polyolefin can be rotationally molded as an inner layer without void formation when the outer layer is thin.

DESCRIPTION OF THE PREFERRED EMBODIMENTS

The present invention is a method of rotationally molding an article having at least two layers, an outer layer made of an outer polymer and an inner layer made of an inner polymer. The outer polymer is fed into the cavity of the rotational mold and rotationally molded to form the outer layer having an inner surface. The outer layer is solidified. The inner polymer is fed into the rotational mold cavity while maintaining the outer layer solid and the inner polymer layer is rotationally molded adjacent to the inner surface of the outer layer.

The outer polymer can be made of a thermoplastic composition. The outer polymer has a melting point higher than the temperature at which the inner layer can be rotationally molded. The inner polymer can be made of a thermoplastic composition. The inner polymer has a melting point lower than the temperature at which the outer polymer becomes a solid. Preferably, the temperature at which the outer polymer becomes a solid is at least 10° F. and preferably, 20° F. to 100° F., higher than the temperature at which the inner polymer becomes a solid. This allows control of the rotational process and compensates for non-uniform heating and temperature ranges over which the outer polymer solidifies. Preferably, both the inner polymer and the outer polymer are thermoplastics and the outer polymer has a higher melting temperature than the inner polymer.

When both the inner polymer and outer polymer are thermoplastic, the outer polymer is fed into the cavity of the rotational mold and rotationally molded to form the outer layer adjacent to the inner surface of the mold cavity. The outer layer is cooled to below the melting temperature of the outer polymer but to above the melting temperature of the inner polymer. The inner polymer is fed into the cavity of the rotational mold and rotationally molded to form the inner layer adjacent to the inner surface of the solidified outer polymer layer. If the outer layer and rotational mold have sufficient heat, the inner layer can be rotationally molded without additional heat. If more heat is required to rotationally mold the inner layer, heat can be added through the mold cavity and outer layer. The outer layer is maintained as a solid below the melting temperature of the outer polymer during the additional heating.

The inner polymer can be added to the rotational mold while the mold is rotating or when the mold is stopped. An advantage of the present invention is that the outer layer can be solidified and the rotation of the mold stopped before the inner polymer is added.

In a preferred process of the present invention, a preferred composition for use as the outer layer is a polyamide composition.

The polyamide composition comprises a polyamide and a copolymer comprising units derived from an alpha-olefin of the formula RCH=CH$_2$ wherein R is H or an alkyl having from 1 to 8 carbon atoms and from 0.2 to 25 mol percent based on the alpha-olefin-acid copolymer of an alpha, beta-ethylenically unsaturated carboxylic acid having from 3 to 8 carbon atoms. The copolymer has from 10% to 100% of the carboxylic acid groups neutralized by metal ions. There is preferably from 1 to 15 percent and more preferably from 3 to 10 percent by weight of the polyamide composition of the copolymer.

The term "polyamide" used in the practice of the present invention is intended to include long chain synthetic polymers which have regularly recurring amide groups as an integral part of the main polymer chain; and hence, include amide-ester copolymers. Suitable polyamides can be prepared by polymerization of a difunctional monomer or equivalently, its cyclized lactam (e.g., epsilon-aminocaproic acid or caprolactam, respectively) or by the reaction of a conjugate pair of monomers, for example, a diamide and dicarboxylic acid (e.g., hexamethylenediamine and adipic acid), or a linear aminoaliphatic acid such as α-amino undecanoic acid.

Suitable polylactams can be produced by the polymerization of lactam monomers of the formula

where R is an alkylene group having from 3 to 12 or more carbon atoms, preferably from 5 to 12 carbon atoms. A preferred monomer is epsiloncaprolactam having 5 carbon atoms in the alkylene group. Lactam monomers in addition to epsiloncaprolactam include pyrollidone, piperodone, valerolactam, caprylactam, lauryl lactam, etc. Also included are copolymers of two or more of the above or similar lactam monomers. Suitable diamines useful in the polymerization of polyamides include propanediamine, hexamethylenediamine, octamethylenediamine, etc. Suitable polycarboxylic acids include acids such as adipic acid, pimelic, suberic, sebacic, dodecaneoic, etc. Also included are copolymers or blends of polyamides of the above categories.

Typically, the number average molecular weight of these polymers is between about 10,000 and about 50,000, preferably 15,000 to 40,000 and more preferably 20,000 to 30,000. This is because mechanical properties improve rapidly until about 20,000, and processing starts to become more difficult above 30,000.

Polyepsiloncaprolactam is the preferred polyamide for use in the present invention. Polyepsiloncaprolactam suitable for use herein can contain a variety of terminal functionality. Preferred terminal functionality is that containing:

(a) A carboxyl group attached to both ends of the polyamide chain;

(b) A carboxyl group attached to one end and an acetamide group attached to the other end of the polyamide chain;

(c) An amine group attached to both ends of the polyamide chain; and (d) A carboxyl group attached to one end and an amino group attached to the other end of the polyamide chain.

It is preferred that the polyepsiloncaprolactam have more chain ends terminated by acid groups than by amine groups. During the polymerization to form polyepsiloncaprolactam, a controlled amount of azelaic acid results in a predetermined excess of polycaprolactam chain ends terminated by acid groups. Preferably, there are from 50 percent to 90 percent, and more preferably from 60 percent to 80 percent, of the end groups acid terminated. Preferably, the end groups are terminated with a dicarboxylic acid, such as azelaic acid. When this is the case, the composition can be rotationally molded in the presence of oxygen. However, it is preferred to use an inert, oxygen-free atmosphere, such as nitrogen or carbon dioxide, to prevent oxidation even where there is excess end groups terminated with carboxyl groups. If there are not more polyepsiloncaprolactam chain ends terminated with acid groups than with amine groups, an inert atmosphere is required for a satisfactory product. Otherwise, the composition is susceptible to oxidation resulting in loss of physical properties.

Polyamides other than polyepsiloncaprolactam can be used, but polyepsiloncaprolactam is preferred. For example, polyhexamethyleneadipamide has a higher melting temperature and flows with more difficulty than polyepsiloncaprolactam. The polyepsiloncaprolactam provides a lower melting, easier processing product wherein the pellets of material flow or knit more readily into each other.

The polyamide composition can be heat stabilized with a copper compound which can be an organic or inorganic copper salt with the copper in cupric or cuprous form. A preferred organic salt is cupric acetate. Preferred inorganic salts are copper halides, including cuprous iodide, and cupric and cuprous chloride. The most preferred copper salt is cuprous iodide. There is from about 0.001 percent to about 0.5 percent by weight, or preferably from about 0.01 to about 0.05 percent by weight of the copper compound, preferably cuprous iodide. When copper compounds are used for heat stabilization, it is preferred to add potassium iodide. There is from 0.001 to 0.3 and preferably 0.01 to 0.1 percent by weight of potassium iodide added.

The polyepsiloncaprolactam composition of this invention does not require the use of a plasticizer for successful rotational molding, although caprolactam can be used as a plasticizer. A small amount of plasticizer, such as caprolactam monomer, can deposit on the mold and must be washed off.

When polyepsiloncaprolactam is polymerized, about 8 percent to about 12 percent of the caprolactam monomer remains. This monomer can be left in the "unwashed" polyepsiloncaprolactam to act as a plasticizer, or it can be leached out with water. The leached polycaprolactam contains only about 1 percent to 2 percent of the caprolactam monomer.

The ionic copolymer can be a random ionic copolymer of an alpha-olefin of the formula $RCH=CH_2$ where R is H or alkyl radicals having from 1 to 8 carbon atoms, and an alpha,beta-ethylenically unsaturated carboxylic acid having from 3 to 8 carbon atoms. The ionic copolymer has at least 10 percent of the carboxyl acid groups neutralized with metal ions. Random ionic copolymers which can be used in the composition of the present invention are described in U.S. Pat. No. 3,264,272, which is incorporated herein by reference.

The cations of metals which are suitable in forming the ionic copolymers which can be used in the present invention can include mono-, di- and trivalent ions of metals and Groups I, II, III, IV-A and VIII of the Periodic table of the Elements. Suitable monovalent cations include cations of sodium, potassium, lithium, cesium, silver, mercury, and copper. Suitable divalent cations include the cations of beryllium, magnesium, calcium, strontium, barium, copper, cadmium, mercury, tin, lead, iron, cobalt, nickel, and zinc. Suitable trivalent cations include the cations of aluminum, scandium, and iron. For the purposes of the composition of the present invention, the most preferred metal cation used to form the ionic copolymer is the cation of zinc.

The degree of neutralization of the ionic copolymer by the metal cations should be at least 10 percent of the carboxylic acid groups. It is generally desirable to neutralize at least 50 percent of the acid groups. The degree of neutralization may be measured by several techniques known in the art, such as infrared analysis or titration. These techniques are disclosed at Pages 74–75 in "Ionic Copolymers" by L. Holliday, published by John Wiley and Sons, New York and Toronto (1975).

The copolymers which can be used to form the ionic copolymers of the present invention are preferably copolymers of ethylene and an alpha,beta-ethylenically unsaturated carboxylic acid. Alpha,beta-ethylenically unsaturated carboxylic acids which can be polymerized with the ethylene include acrylic acid, methacrylic acid, itaconic acid, and ethacrylic acid. Further, the ionic copolymers can be copolymers of the type described and used in U.S. Pat. No. 4,174,358, which is incorporated herein by reference.

Other known polyamide impact modifiers and combinations of impact modifiers can be used. Included are those discussed in the Background of the Invention section. In addition to the copolymer described above, ester copolymers can be used. A preferred ester copolymer is that of ethylene and an ester selected from the gorup of alkyl esters of alpha,beta-ethylenically unsaturated carboxylic acids having 3 to 8 carbon atoms, wherein the alkyl group contains 1 to 4 carbon atoms. Examples of such esters include methyl, ethyl, propyl, isopropyl, butyl, isobutyl, and t-butyl esters of the carboxylic acids. The preferred esters are methacrylate, ethyl acrylate, and methyl methacrylate and ethyl methacrylate. More preferred are ethyl acrylate and ethyl methacrylate, with ethyl acrylate being the most preferred.

The polyamide composition blends of the present invention can be combined into a uniform mixture by melt blending on conventional equipment such as a Banbury internal mixer, mill mixing, extruder, or the like. Alternately, the blends may be made by solution blending or by dry mixing together of the components followed by melt fabrication of the dry mixture by extrusion or injection molding. In the case of injection molding of dry mixtures, screw preplastication or other method of giving good mixing should be employed. Preferably the polyamide composition is melt blended in an extruder with the molten extrudate preferably in the form of strands passing through a cooling means such as a water bath and then pelletized.

The cooling water can be at any temperature greater than 0° Centigrade up to 50° Centigrade but is preferably at the temperature available from the tap. Typically the cooling water is from 5° Centigrade to 20° Centigrade.

After cooling the polyamide composition is dried. Preferably the polyamide is air dried as it proceeds over various support means to be formed into particles suitable for rotatonal molding. Optionally, the polyamide can be dried by hot inert gases such as nitrogen or under a vacuum. The polyamide composition can be formed into pellets using pelletizers, alternately it could be ground powder.

The preferred polyamide has been found to be particularly useful as an outer layer when a polyolefin polymer is used as an inner layer. The polyamide composition does not sag after it has been formed into a rotationally molded layer and is cooled and the rotation of the rotational mold is stopped to add the inner polymer. Further, the polyamide composition has been found to have excellent adhesion to other inner layers, particularly polyethylene. This minimizes delamination of the inner and outer layers.

Outer wall thicknesses can be from $\frac{1}{8}$ inch up to $1\frac{1}{2}$ inches and preferably $\frac{1}{4}$ inch up to 1 inch using the polyamide composition of the present invention. The inner polymer layer can be added without sagging of the outer polyamide composition layer using the process of the present invention.

Further, it has been found that a multilayer rotationally molded article can be made using the polyamide composition of the present invention as an outer layer while it is above its melting point. The outer polyamide composition layer should be thinner than 3/16 of an inch and preferably from 1/16 to $\frac{1}{8}$ inch. It is not necessary to cool the outer polyamide layer to below its melting point and add an inner layer. In this embodiment, the inner layer is preferably a relatively thin layer of less than about 3/16 inch and preferably between 40 mils and $\frac{1}{8}$ inch.

The mold can continue to rotate while the inner layer polymer is being added. Preferably, the inner polymer layer is a polyolefin, with polyethylene-based polymers being particularly preferred. Rotationally molded articles having an outer polymeric layer which remained above its melt temperature when a polyethylene inner layer was added had no void formation. The inner layer is from 40 mils to 3/16 inches thick and preferably from 40 mils to $\frac{1}{8}$ inch thick. The polyamide composition of the present invention results in excellent adhesion to the polyolefin layer.

The polyamide composition for rotational molding can be fed into the mold in powder or pellet form. If the polyepsiloncaprolactam particles are too small, their surface area is so large that exposure to the atmosphere results in excessive moisture pickup. It is preferred to use pellets which are not as sensitive to moisture pickup. If the polyepsiloncaprolactam particles are too large, it takes a longer time for them to melt and thinner parts cannot be made. Pellets can be from about 1/32 by 1/32 inch (or about 1/32 inch average diameter) to about ⅛ by ⅛ inch (or about ⅛ inch average diameter). A preferred pellet shape is a cylindrical pellet from about 1/32 to 1/16 inch in diameter, by about 1/16 to ⅛ inch long. The powder can be as small as 35 mesh with a 12-mesh powder preferred.

The composition for use as the outer layer is formed into particles suitable for rotational molding. The particles are fed into the rotational mold. The outer polymer is heated within the mold as it is rotated. Typically, the mold is indexed into an oven and heated with hot air while the mold rotates. Generally, the rotational mold rotates simultaneously along two perpendicular axes. The mold is heated until the particles within the mold melt and flow together on the inside surface of the mold.

The preferred outer polymer layer polyamide composition can be processed in most commercial rotational molding machines. The oven air temperatures range during the heating step from about 288° C. (550° F.) to about 399° C. (750° F.), and preferably from about 302° C. (575° F.) to about 352° C. (675° F.). If the temperature is too high during rotational molding, the impact properties deteriorate. The temperature must be high enough for the particles to fuse together to form a smooth inner surface of the molded article. The mold is heated by suitable means known in the art. Generally, the mold rotates within a forced air circulating oven.

The polyamide is preferably polyepsiloncaprolactam. After the polyepsiloncaprolactam compsition has been formed within the mold cavity and the heating step as disclosed above has occurred, the rotational mold can be cooled while rotating. The mold is cooled to a temperature below the melting point of the polyepsiloncaprolactam composition, which is approximately 420° F. At this point the rotation of the mold is preferably stopped and a second polymer having a melt temperature below that of the polyamide is fed into the mold cavity. The inner layer forms upon resumption of the rotation. The mold is rotated in a manner and rotation range which is similar to that discussed above with regard to rotation of the mold to form the polyamide composition layer. If the outer polymer layer and mold retain sufficient heat, the mold can be rotated outside the oven to form the inner layer. However, if additional heat is necessary, the mold can be put back into the oven and heated. The outer layer should remain solid and should not be heated to above its melting point.

After the heating step the mold is cooled. The part must be cool enough to be easily removed from the mold and retain its shape. Preferably, the mold is removed from the oven while continuing to rotate. Cool air is first blown on the mold. The air can be at ambient temperature. After the air has started to cool the mold for a controlled time period, a water spray can be used. The water cools the mold more rapidly. The water used can be at cold water tap temperature, usually from about 4° C. (40° F.) to about 16° C. (60° F.). After the water cooling step, another air cooling step may optionally be used. This is usually a short step during which the equipment dries with heat removed during the evaporation of the water.

The heating and cooling cycle times will depend on the equipment used and the article molded. Specific factors include the part thickness and mold material.

During the heating and cooling steps, the mold containing the molded article is continually rotated along two perpendicular axes. The rate of rotation of the mold about each axis is limited by machine capability and the shape of the article being molded. A typical range of operation which can be used with the present invention is to have a ratio of rotation of the major axis to the minor axis of from 1:2 to 1:10, and 2:1 to 10:1.

Preferably, the rotation molding is conducted under an inert atmosphere within the mold. However, this is not necessary, although it is preferred when using the preferred composition containing polyepsiloncaprolactam having an excess of chain ends terminated by a dicarboxylic acid group. When it is desired to use an inert atmosphere, the mold cavity can be purged with nitrogen. Most rotational molding machines have arms which are drilled for gas injection, so that all that is necessary is to connect a nitrogen gas cylinder to the arm, using the rotary valves in the connection. Alternatively, dry ice can be added to the mold cavity at the time the resin is charged to the mold. The dry ice will sublime during the heating cycle and provide an inert atmosphere.

The mold surface can be sprayed or coated with a mold release coating. A preferred mold release agent is a baked-on silicon based mold release coating, such as Freekote ®. This coating is baked for 10–20 minutes at about 282° C. (550° F.) to 343° C. (650° F.). The mold is cooled and sanded on the inside. The sanded surface allows the composition to maintain contact during molding and not release too readily and warp while being cooled. Yet upon cooling, the molded article easily releases. A vent can be used to avoid pressure buildup on the inside of the mold during the heating step.

It has been found that the polyamide composition containing the above described copolymer has satisfactory adhesion to the inner polymer layer when the inner polymer layer is a polyolefin. Optionally, additional layers of other polymers having melt temperature lower yet than the second polymer can be added as additional layers and the process repeated. Polymers suitable in the method for rotationally molding as an inner layer when the outer layer is a polyamide include, but are not limited to, polyolefins, such as polyethylene, polypropylene, and cross-linkable polyethylene, fluoropolymers and the copolymer of ethylene and chlorotrifluoroethylene; polyvinyl chloride, polyacetals, and polyurethane. The inner layers can contain additional materials such as fillers as described in U.S. patent application Ser. No. 361,684 filed Mar. 25, 1982, hereby incorporated by reference.

Polymers useful in the present invention include, but are not limited to, polyolefins, polyamides, fluoropolymers, polyvinyl chloride, polyacetate, and polyurethanes suitable for rotational molding. It is recognized that the process of the present invention can be used to successively add a layer of polymeric material to the inner surface of each polymer layer. The layers which are outer to the last inner layer are maintained as solids and the innermost polymer is rotationally molded to the inner surface of the last added layer.

The process of the present invention, where the outer layer is cooled to below its melting temperature, can be used to make multilayered rotationally molded articles having relatively thick inner layers as well as relatively thick outer layers. Inner layers can be thin, from 40 mils up to 3/16 inch but can also be thick in the range of from 3/16 up to 1½ inches and preferably up to 1-inch thick without delamination.

The present invention includes rotationally molded polyamide articles having at least one polyamide layer having an inner surface. The polyamide layer comprises the polyamide composition as described above. There can be a layer adjacent to the inner surface of the polyamide composition layer made of a polymer suitable for rotational molding and having a melt temperature lower than the melt temperature of the polyamide layer. The additional layers can be selected from the group disclosed above. A preferred rotationally molded article contains an outer layer of polyepsiloncaprolactam and the copolymer of ethylene and methacrylic acid neutralized with zinc ions and an adjacent inner layer made of a polyolefin, preferably polyethylene.

Several examples are set forth below to illustrate the nature of the invention and the manner of carrying it out. However, the invention should not be considered as being limited to the details thereof. All parts are percent by weight unless otherwise indicated. The physical test results were obtained using the following procedures: drop weight impact—ASTM D-3029-81 with a 3 inch specimen support; tensile strength at yield, and elongation at break—ASTM D-638; and flexural strength and flexural modulus—ASTM D-790.

In the following examples a McNeil-Akron Model No. 500/48 Laboratory Rotational Molding Machine was used. This machine has a 500 lb. capacity and a 48 inch swing envelope. This mold rotates simultaneously about 2 perpendicular axes, a major axis and a minor axis. The moldings made were: 12 inch cubes from stainless steel molds using 4 inch diameter feed port plugs made of glass filled polytetrafluoroethylene; and tanks 14 inches long and having a 10 inch outside diameter from cast aluminum molds using 3 inch diameter plugs made of unfilled polytetrafluoroethylene. The plugs were equipped with a gas inlet port and a vent port. This plug was held in place by a quick release lever clamp to permit quick removal while the mold was hot.

In all of the examples the polyamide used was polyepsiloncaprolactam having more chain ends terminated with dicarboxylic acids such as azelaic or sebacic acid than amine groups. The polyepsiloncaprolactam had about 45 milliequivalents (m.eq.) of carboxyl and about 20 m.eq. amine terminated end groups per kilogram of polyepsiloncaprolactam. The polyepsiloncaprolactam has an estimated formic acid relative viscosity of from about 65 to about 80. The polyepsiloncaprolactam was washed in water to remove unreacted caprolactam monomer. About 1.5% caprolactam remains. The polyepsiloncaprolactam contained about 0.02 weight percent by weight of cuprous iodide.

The ionic copolymer used was Surlyn ® 1801, ethylene methacrylic acid neutralized with zinc ions sold by the Dupont Company.

In each of the examples the following process was generally followed with specific details and variations noted with each example.

The mold was charged with ⅛ inch (0.32 cm) long by 1/16 inch (0.16 cm) diameter cylindrical polymer pellets enclosed. Carbon dioxide in the form of dry ice was introduced to displace air in the mold. The vent was open to the atmosphere and plugged loosely with glass to prevent molding powder from escaping.

The mold was indexed into the heating oven set at a desired temperature and rotated biaxially for a given amount of time at a given rotation ratio and major axis speed. The rotation ratio is defined as the number of rotations made by the major axis for one rotation of the mold (or minor axis). At the end of the first heat cycle the mold was indexed back out of the work area while rotating. The mold was air cooled until the first layer of polymer solidified. The mold rotation was stopped, the port was opened and the inner layer polymer was added. The mold was then rotated until the second layer formed. The mold was indexed into the cooling station and cooled for a given time in air, and a given time in a water spray, and a final period in air while being biaxially rotated and finally the part was removed.

EXAMPLE 1

The aluminum tank mold was charged with 7 pounds of pellets of a polyamide composition of polyepsiloncaprolactam, 7.5 percent by weight of Surlyn ® 1801, and 0.2 percent of magnesium oxide which is added as an impact modifier and 300 grams of dry ice ($CO_2$). The port was plugged with a polytetrafluoroethylene plug with the vent port plugged loosely with fiberglass. The mold was rotated with a 4:1 rotation ratio with a spindle speed of 6 rpm and indexed into the oven for 35 minutes at 650° F. At the end of 35 minutes the mold was indexed out of the oven and into a cooling area for 18 minutes during which time air at ambient temperature was blown on the mold surface. The mold was then indexed to the work area, rotation was stopped and the feed port was opened. One pound of Sclair TM 8405 a medium density polyethylene powder having a melt index of 2.7 measured according to ASTM D-1238 sold by the DuPont Company was added. The port was replugged and rotation resumed. The mold rotated for 4 minutes in the work area. The mold was then indexed into the cooling area and cooled for 5 minutes in forced air at ambient temperature and 25 minutes with a tap water spray. The mold was indexed to the work area and the tank was removed. One end of the tank was cut off. The tank had uniform wall thickness, complete flowout of the inside layer and no voids in the outside layer. The outside layer was about 3/8 inch thick and the inside layer was about 1/16 inch thick

COMPARATIVE 1

Example 1 was repeated except that only 200 grams of dry ice was used and Paxon ® rotational molding grade polyethylene powder was used in place of the Sclair TM 8405 polyethylene. Paxon ® 7001 high density polyethylene is sold by Allied Corporation and has a melt index of 6 to 7 measured according to ASTM Test No. D-1238 at 190° C. The mold was rotated at a 4:1 rotation ratio with a spindle speed of 6 rpm. The mold was heated for 35 minutes at 650° F. After that, it was indexed into the cooling area and air cooled for only 10 minutes. The mold was then indexed back to the work area and rotation was stopped. The port was opened and one pound of Paxon ® polyethylene was added. The mold was replugged and rotation resumed. The mold was indexed back into the oven for 4 minutes at 650° F. The mold was indexed to the cooling area and air cooled for 20 minutes and water cooled for 20 minutes. The mold was indexed to the work area and the tank was removed. The tank released freely. One end of the tank was cut off. The top of the tank had a thickness of 5/16 inch and the bottom had a thickness of 9/16 inch, indicating sagging. The thickness difference was in the polyamide outer layer. The tank had voids in the corners of the outside layers. This indicated that the polyethylene was added while the polyamide was above its melt temperature.

EXAMPLE 2

A 12-inch cube was rotationally molded under a nitrogen atmosphere. The mold was charged with 5 pounds of pellets of a polyamide composition of polyepsiloncaprolactam, 5 percent by weight Surlyn ® 1801, and 0.2 percent of magnesium oxide. The port was plugged with a glass filled polytetrafluoroethylene plug. The mold was rotated at a 4:1 rotation ratio with a spindle speed of 6 rpm. The mold was indexed into an air heated oven at 650° F. for 22 minutes. The mold was then indexed to the work area and rotation was stopped. The port was open and 2 pounds of Paxon ® 7001 polyethylene powder was added and the mold was replugged and rotation resumed. The mold was indexed back into the oven to be heated at 650° F. for 4 minutes. The mold was then indexed to the cooling area and cooled for 10 minutes in forced air and 10 minutes in tap water. The mold was then indexed to the work area and opened. The cube released freely. The cube was cut open and there was no apparent sag or voids. The adhesion of the two layers was good. The polyamide layer had a thickness of ⅛ inch and the polyethylene layer was about 1/16 inch.

COMPARATIVE 2

Example 2 was repeated using 5 pounds of polyepsiloncaprolactam in place of the polyamide composition of the example. The adhesion of the layers was not as good in this Comparative compared to Example 2. The layers could be separated with a knife edge. In the Example 2 molding it was more difficult to separate the layers.

EXAMPLE 3

This example illustrates that in the process of the present invention, the outer layer can be formed and cooled to below the melt temperature of the inner layer polymer. The outer layer is then heated to above the melting temperature of the inner layer polymer and the inner layer was rotationally molded.

The 10-inch aluminum tank mold was charged with 4.5 pounds of polyepsiloncaprolactam and 200 grams of dry ice. The feed port was plugged. The mold was rotated at a 4:1 rotation ratio with a spindle speed of 6 rpm and indexed into the oven and heated at 650° F. for 30 minutes. The mold was indexed to the cooling area and cooled for 20 minutes in air. The mold was then indexed to the work area, rotation was stopped and 0.5 pounds of Paxon ® polyethylene was added. Rotation was continued and the mold was indexed into the oven where it was heated to 650° F. for 5 minutes. The mold was then cooled for 5 minutes in air and 20 minutes in water. The mold was indexed to the work area, rotation was stopped and the mold was opened. The port released freely. Flowout of the inner layer was complete. The outside layer was ¼ inch thick and the inside layer was 1/32 inch thick.

COMPARATIVE 3

Example 3 was repeated except that after addition of the polyethylene, the mold rotated in air in the work area for 5 minutes. The inner polymer did not receive sufficient heat to flow out.

What is claimed is:

1. A method of rotationally molding an article having at least two layers, an outer layer made of a polyamide composition comprising a polyamide and a copolymer comprising units derived from an alpha-olefin of the formula $RCH=CH_2$ wherein R is H or an alkyl having from 1 to 8 carbon atoms and from 0.2 to 25 mold percent based on the copolymer of an alpha,beta-ethylenically unsaturated carboxylic acid having from 3 to 8 carbon atoms, the copolymer having 10% to 100% of the carboxylic acid groups neutralized by metal ions, and an inner layer made of a polyolefin, wherein the inner layer is a polyolefin suitable for rotational molding, the outer polyamide composition layer having a higher melting point temperature than the inner layer, comprising the steps of:

feeding the polyamide composition into the cavity of a rotational mold;

rotationally molding the polyamide composition to form the outer layer;

cooling the polyamide layer to below the polyamide composition melting temperature but to above the melting temperature of the polyolefin;

feeding the polyolefin into the cavity of the rotational mold; and rotationally molding the polyolefin to form the inner layer adjacent to the inner surface of the solidified outer polyamide composition layer.

2. The method as recited in claim 1 wherein the step of rotationally molding the outer layer further comprises:

feeding the polyamide composition into the mold cavity;

rotating the rotational mold; and heating the composition within the mold.

3. The method as recited in claim 2 wherein the step of rotationally molding the polyolefin to form the inner layer further comprises:

feeding the inner polymer into the mold cavity, and rotating the rotational mold, there being sufficient residue heat in the outer layer and rotational mold to form the inner layer without the application of additional heat.

4. The method as recited in claim 2 wherein the step of rotationally molding the polyolefin to form the inner layer further comprises:

feeding the inner polymer into the mold cavity, and rotating the rotational mold;

heating the mold sufficiently to melt the inner polymer and to form the inner layer while maintaining the outer layer solid.

5. The method as recited in claim 2 wherein the step of feeding the polyolefin into the cavity of the rotational mold further comprises feeding the inner polymer through a feed port communicating into the cavity through the outer layer and any additional layers formed.

6. The method as recited in claim 5 wherein the feed port is plugged with a polytetrafluoroethylene plug.

7. The method as recited in claim 1 wherein the copolymer is derived from ethylene and methacrylic acid, neutralized from 10% to 100% by zinc ions.

8. The method as recited in claim 1 wherein the composition comprises from 1 to 15 percent by weight of the copolymer.

9. The method as recited in claim 8 wherein the composition comprises from 3 to 10 percent weight of the copolymer.

10. The method as recited in claim 1 wherein the polyamide is polyepsiloncaprolactam.

11. The method as recited in claim 1 wherein the polyolefin is polyethylene.

12. A method of rotationally molding an article having at least two layers, an outer polyamide layer made of a polyamide composition and an inner polyolefin layer made of a polyolefin, the polyamide composition comprising the polyamide and a copolymer comprising units derived from an alpha-olefin of the formula $RCH=CH_2$ wherein R is H or an alkyl having from 1 to 8 carbon atoms and from 0.2 to 25 mol percent base on the copolymer of an alpha,beta-ethylenically unsaturated carboxylic acid having from 3 to 8 carbon atoms, the copolymer having from 10% to 100% of the carboxylic acid groups neutralized by metal ions, comprising the steps of:

feeding the polyamide composition into the cavity of the rotational mold;

rotationally molding the outer polyamide layer from 40 mils to 3/15 inches thick;

feeding the inner polyolefin into the cavity of the rotational mold while the polyamide composition remains above the melting point of the polyolefin and rotationally molding the inner polyolefin layer.

* * * * *